United States Patent [19]

Miller, Jr. et al.

[11] 4,328,064

[45] May 4, 1982

[54] APPARATUS FOR SHINGLING TICKETS

[76] Inventors: Rex B. Miller, Jr., 4595 Janice Dr., Atlanta, Ga. 30337; Manfred Rudy, 4461 Lambert Dr., Kennesaw, Ga. 30144

[21] Appl. No.: 135,526

[22] Filed: Mar. 31, 1980

[51] Int. Cl.3 .............................................. B32B 31/04

[52] U.S. Cl. .................................... 156/558; 156/566; 156/569; 156/570; 270/52; 270/58; 271/93; 271/99; 271/165; 271/167; 271/197; 271/225; 271/264

[58] Field of Search ............... 156/558, 564, 566, 569, 156/570; 229/69; 271/93, 99, 161, 165, 167, 197, 225, 264, 33; 270/52, 58

[56] References Cited

U.S. PATENT DOCUMENTS

| | | | |
|---|---|---|---|
| 2,222,983 | 11/1940 | Marcher et al. | 93/1 |
| 2,476,250 | 7/1949 | Paulsen | 270/58 |
| 2,816,755 | 12/1957 | Dusenbury et al. | 270/58 |
| 2,816,756 | 12/1957 | Dusenbury et al. | 270/58 |
| 2,819,067 | 1/1958 | Dusenbury et al. | 270/58 |
| 2,873,115 | 2/1959 | Dusenbury et al. | 270/58 |
| 3,336,024 | 8/1967 | Brechner | 270/58 |
| 3,565,728 | 2/1971 | Alton | 156/566 |
| 3,874,648 | 4/1975 | King et al. | 270/53 |
| 3,917,259 | 11/1975 | Salvade | 271/165 |

*Primary Examiner*—Caleb Weston
*Attorney, Agent, or Firm*—Newton, Hopkins & Ormsby

[57] ABSTRACT

A ticket shingling process and an apparatus for performing the process by which tickets are serially stripped from the bottom of a stack of tickets by means of a reciprocating suction means which, in conjunction with rotable feed means, transfers the stripped ticket to a longitudinally extending first conveyor. Suction means is provided above the downstream end of the first conveyor to lift each ticket into engagement with ticket aligning means on a second, laterally extending conveyor where glue is applied to the ticket. The second conveyor is advanced a predetermined increment whereupon a succeeding ticket is mated with the first ticket in adhesive offset or shingled manner. The process is repeated until a predetermined number of tickets comprise the ticket assembly. Means is provided for alternative movement of the second conveyor to accomplish desired ticket placement within a bank.

22 Claims, 18 Drawing Figures

APPARATUS FOR SHINGLING TICKETS

BACKGROUND OF THE INVENTION (1) Field of the Invention

This invention relates to a method and apparatus for handling paper and more particularly to a method and apparatus for shingling tickets to form a bank of tickets.

(2) Background of the Invention

There are several prior art devices that releasably secured to each other individual strips of paper or tickets, such as checks, receipts and time records, to form shingled or overlapping banks of tickets which are normally utilized in a "pegboard" system. Each of the tickets extends beyond the succeeding ticket by an equal amount and spots of glue serve to hold the tickets in assembled relationship.

The previous ticket shingling devices had several drawbacks, the most serious being that they all featured top loading and top feeding of the tickets which necessitated that the ticket stripping step had to be halted when a new supply of tickets was fed into the machine. Thus, the machines could not be continually operated at high speed.

Also, the machines were very bulky and susceptible to breakdown since the stripping means was usually a number of suction cups reciprocally movable from a position overlying the stack of sheets to a remote position where the gluing took place. Further, the prior art devices were not easily adjustable between "Style 1" shingling and the reverse "Style 2" shingling.

SUMMARY OF THE INVENTION

The above disadvantages are overcome by the present invention which forms bank of shingled tickets by stripping tickets one by one from the bottom of a stack of tickets and gluing them together in a predetermined sequence. As used herein, the term "tickets" refers generically to checks, receipts, charge slips and other forms normally associated with pegboard or pegstrip systems. The apparatus comprises a stacking and stripping means, feeding means, gluing means and advancing means whereby the tickets are stripped from the bottom of stack, fed in one direction to the gluing station where the tickets are sequentially mated together in adhesive cooperation and then advanced in a direction which is transverse to the first direction.

The apparatus is generally T-shaped in design with the stacking means located at its base. The tickets are provided with a series of apertures spaced along one edge thereof and a stack of them are maintained in a vertical attitude, with the laterally extending spaced apertures to the rear.

The stripping means is located beneath the stacking means and comprises a suction element that is reciprocally movable from a ticket securing position to a ticket releasing position remote from the ticket securing position. Suction valve means are operatively associated with the suction element to alternatively allow suction to be applied through the suction element in the ticket securing position and to prevent suction from being applied in the ticket releasing position. The stripping means removes the bottommost ticket from the stack and moves the stripped ticket along a linear path to the ticket releasing position.

The feeding means includes a pair of longitudinally extending, spaced, opposed, parallel endless conveyor belts which receive therebetween at their upstream ends the suction element in its ticket releasing position. The upstream ends of the conveyor belts are reciprocally movable about a laterally extending axis between a downward position and an upward position so as to grip the ticket between the conveyor belts and a pair of fixed, spaced, rollers rotating about a laterally extending axis disposed above the ticket releasing position. The reciprocating, arcurate movement of the upstream ends of the conveyor belts is timed so as to be in its uppermost position just before the suction element is in its ticket releasing position. In that manner, the stripped ticket is gripped between the conveyor ends and the upper rollers to give positive displacement of the ticket along the conveyor path.

Disposed above the downstream end of the conveyors is a ticket lifting means, a longitudinally extending, overhead conveyor which in one embodiment, provides suction along the lower flight of its conveyor belt. Suction is applied through the suction conveyor in timed relationship to the ticket being at the end of the path defined by the pair of conveyor belts. The ticket is lifted upwardly from the conveyor belts into adhering engagement with the lower face of the suction conveyor belt and carried longitudinally to a depositing positon whereby the ticket laterally overlies a pin belt conveyor on the advancing means which is transverse to the path of the pair of feeding conveyor belts. When the ticket reaches the depositing position, the vacuum is removed from the suction conveyor, allowing the ticket to fall so that the apertures are engaged by pins on the pin belt.

An alternative embodiment for the overhead conveyor is to eliminate suction being applied to the ticket lifting means to that the ticket adheres to the lower flight of the conveyor belt by means of friction. The use of suction is dependent upon the type of ticket stock utilized.

The gluing means includes a pair of glue nozzles spaced outwardly of the sides of the overhead conveyor and above the pin belt which reciprocally move up and down to place spots of glue on the ticket surface. Associated with the glue nozzles are vertically reciprocating rigid feet which press downwardly on each ticket as the ticket is advanced and the glue nozzle rises on its upward stroke. Means is provided to interrupt the downward movement of the glue nozzles after a predetermined number of tickets have been assembled in order to limit the length of the shingled bank of tickets formed by the machine.

The ticket advancing means inclues a pin conveyor that longitudinally extends through a passageway formed in the flat ticket receiving surface that is transverse to the direction of the conveyor belts. Means is provided to selectively move the pin conveyor in alternate direction and include the support rollers for the opposed ends of the pin conveyor belt each being operatively connected to a different ratchet and pawl assembly that is independently powered. The determination of which direction the pin belt moves is made by actuation of a respective one of the ratchet and pawl assemblies.

Therefore, it is a primary object of the present invention to provide an improved ticket shingling machine.

Another object of the present invention is to provide a ticket shingling machine having a top loading of the tickets and a bottom feeding of the tickets.

A further object of the present invention is to provide a machine that easily and selectively assembles a bank of tickets into Style 1 or Style 2.

A still further object of the present invention is to provide a ticket shingling machine that is compact, easy to operate and not easily susceptible to ticket jamming.

DETAILED DESCRIPTION OF THE ILLUSTRATIVE EMBODIMENT

Figure 1:
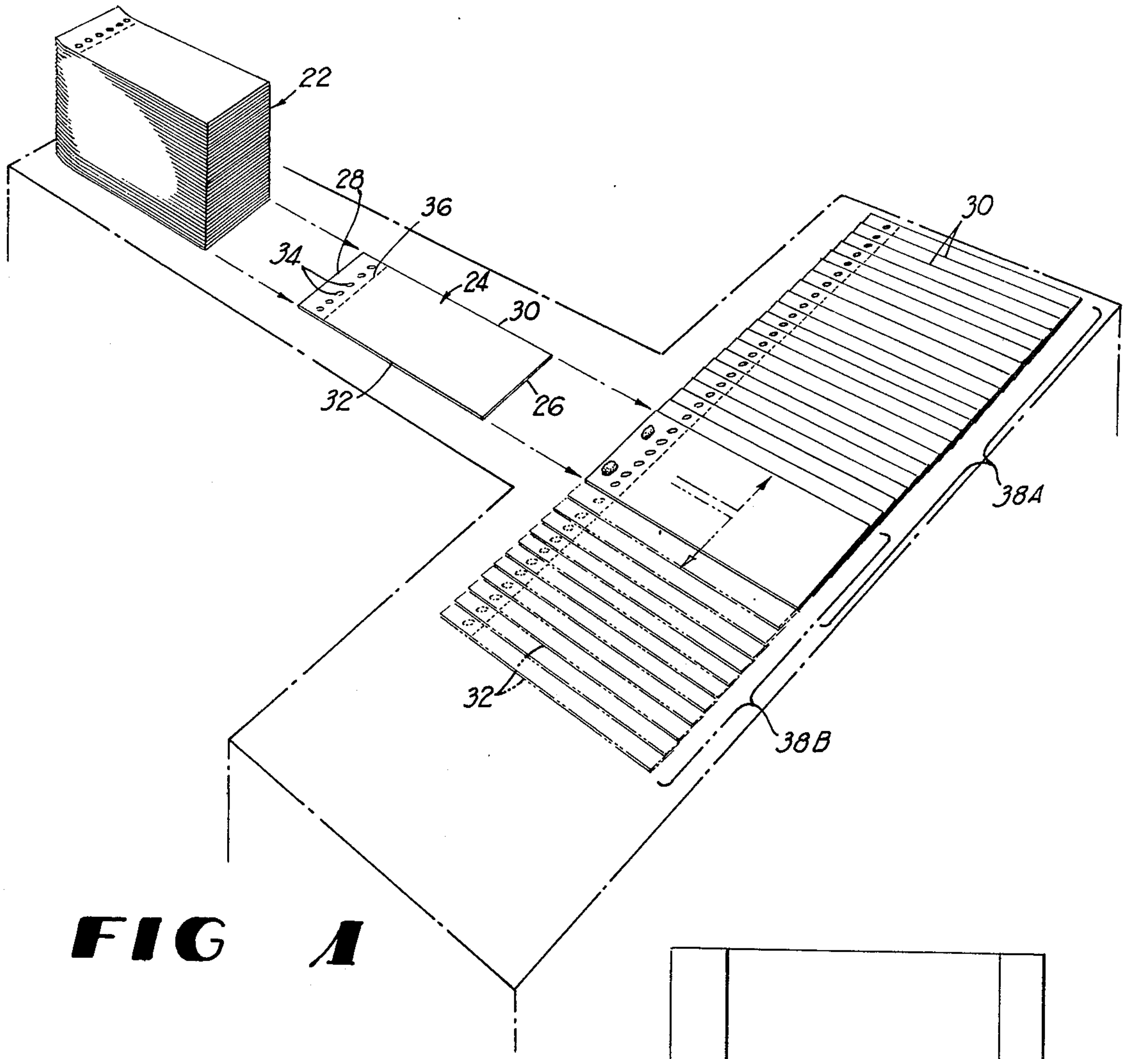
FIG. 1 is a schematic view of the path of the tickets through the apparatus of the present invention.
Figure 2:
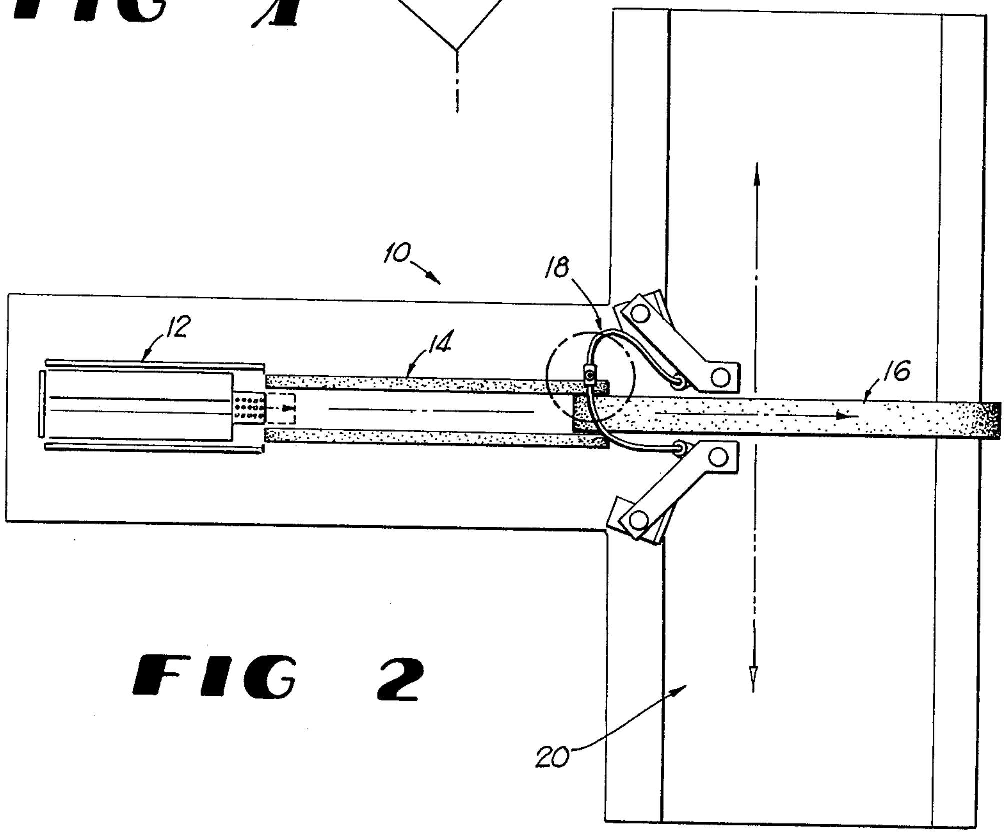
FIG. 2 is a top plan schematic view of the apparatus of the present invention.

Referring to the figures of the drawings, the numeral 10 denotes generally the ticket shingling machine of the present invention having, as shown in FIG. 2, a ticket stacking and stripping section 12, the ticket feeding section 14, the ticket lifting section 16, the gluing section 18 and the ticket advancing section 20. Before describing the machine 10 in detail, it will be helpful to refer to FIG. 1 for a general overall view of the invention and its function.

FIG. 1 shows schematically a stack 22 of individual tickets 24 which are generally rectangular in shape, having a leading edge 26, an opposed rear edge 28 and opposed sides 30, 32. A plurality of laterally extending, spaced apertures 34 are formed between the rear edge 28 and the perforation 36. The bottommost ticket 24 is stripped at the stacking and stripping section 12, fed sequentially in a longitudinal direction through the ticket feeding section 14, lifted by the ticket lifting and depositing portion 16 into engagement with the transverse ticket advancing section 20 located at the downstream end of section 14 where the individual tickets 24 are mated together in adhesive cooperation by the gluing section 18 to form a bank 38A of shingled tickets. That is commonly referred to as "Style 1" shingling wherein side 30 is exposed along the bank.

The present invention 10 is also capable of producing "Style 2" shingling which is exemplified by bank 38B in FIG. 1 wherein side 32 is the exposed side. Bank 38B is formed by reversing the movement of the ticket advancing section 20, as described in detail hereinbelow.

Power Means

Figure 4:
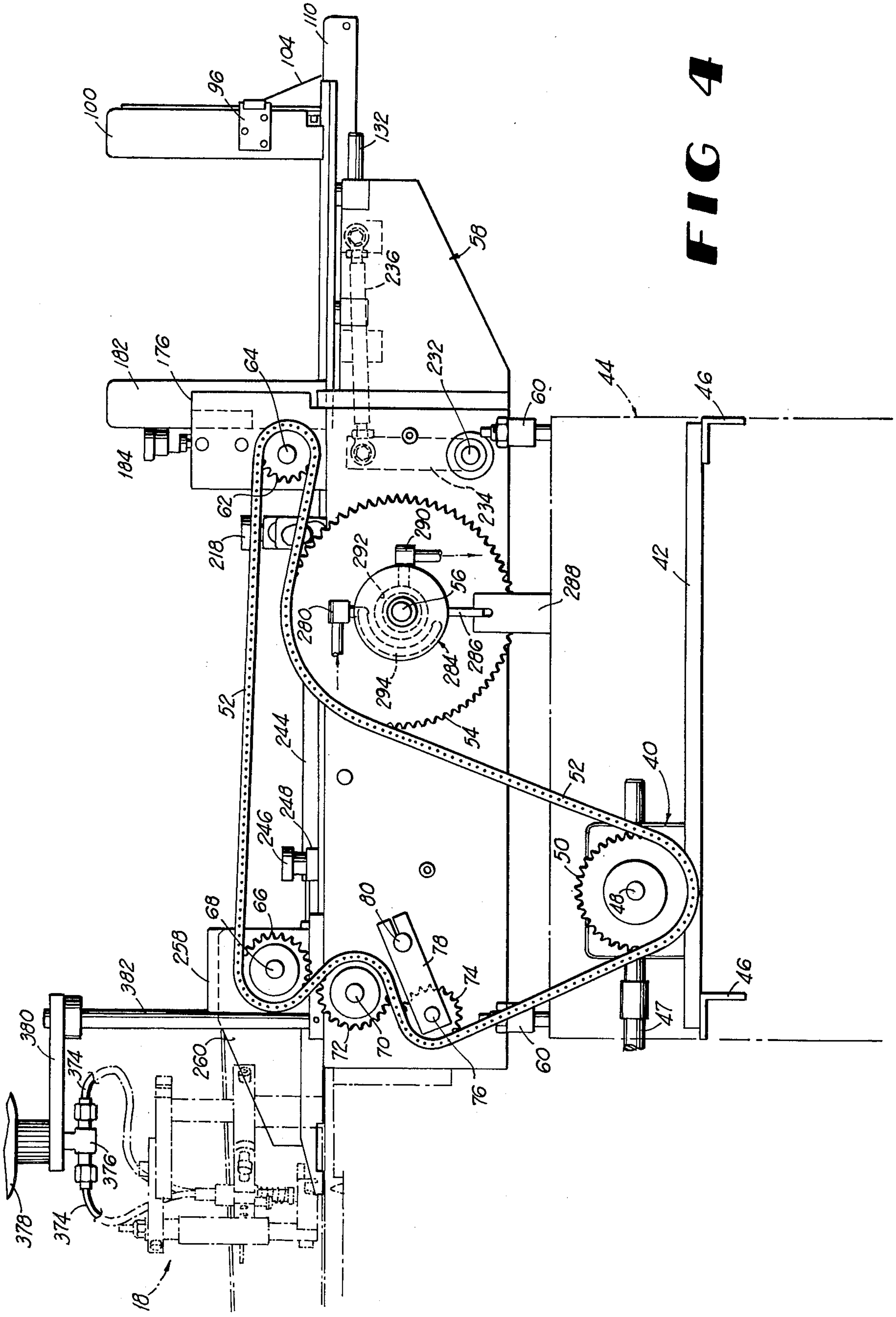
FIG. 4 is a right side elevational view of the apparatus of the present invention with portions of the gluing and ticket advancing sections shown in phantom lines.

The means for powering some of the sections of the machine 10 is shown in FIG. 4 and includes a conventional gear box 40 secured to the bottom 42 of the lower frame assembly 44 which is supported above the ground by laterally extending L-shaped channel members 46 attached to the front and rear edges of bottom 42. The gear box 40 includes a power input shaft 47 operatively connected to the motor 47A (see FIG. 12) and a transverse shaft 48 to which is affixed drive sprocket 50 that extends outwardly of the lower frame assembly 44. A drive chain 52 runs over drive sprocket 50 and is routed upwardly to pass about large sprocket 54 that is affixed to drive shaft 56 which laterally extends through the upper frame assembly 58 supported above the lower frame assembly 44 by spacers 60.

The drive chain 52 then meshes with small, toothed sprocket 62 affixed to laterally extending rotatable shaft 64 to which are secured the upper pair of ticket gripping rollers to be described in the ticket feeding section 14. The chain 52 then longitudinally extends to engage sprocket 66 affixed to shaft 68 over which passes the conveyor belt of the ticket lifting and positioning section 16. Disposed beneath shaft 68 is drive shaft 70 secured to sprocket 72, the shaft 68 powering the pair of conveyors that form a portion of the ticket feeding section 14. Finally, the belt 52 passes over idler sprocket 74 on shaft 76 rotatably mounted on one end of bar 78 that is affixed to pin 80 on upper frame assembly 58.

TICKET STACKING AND STRIPPING SECTION

Figures 6, 7:
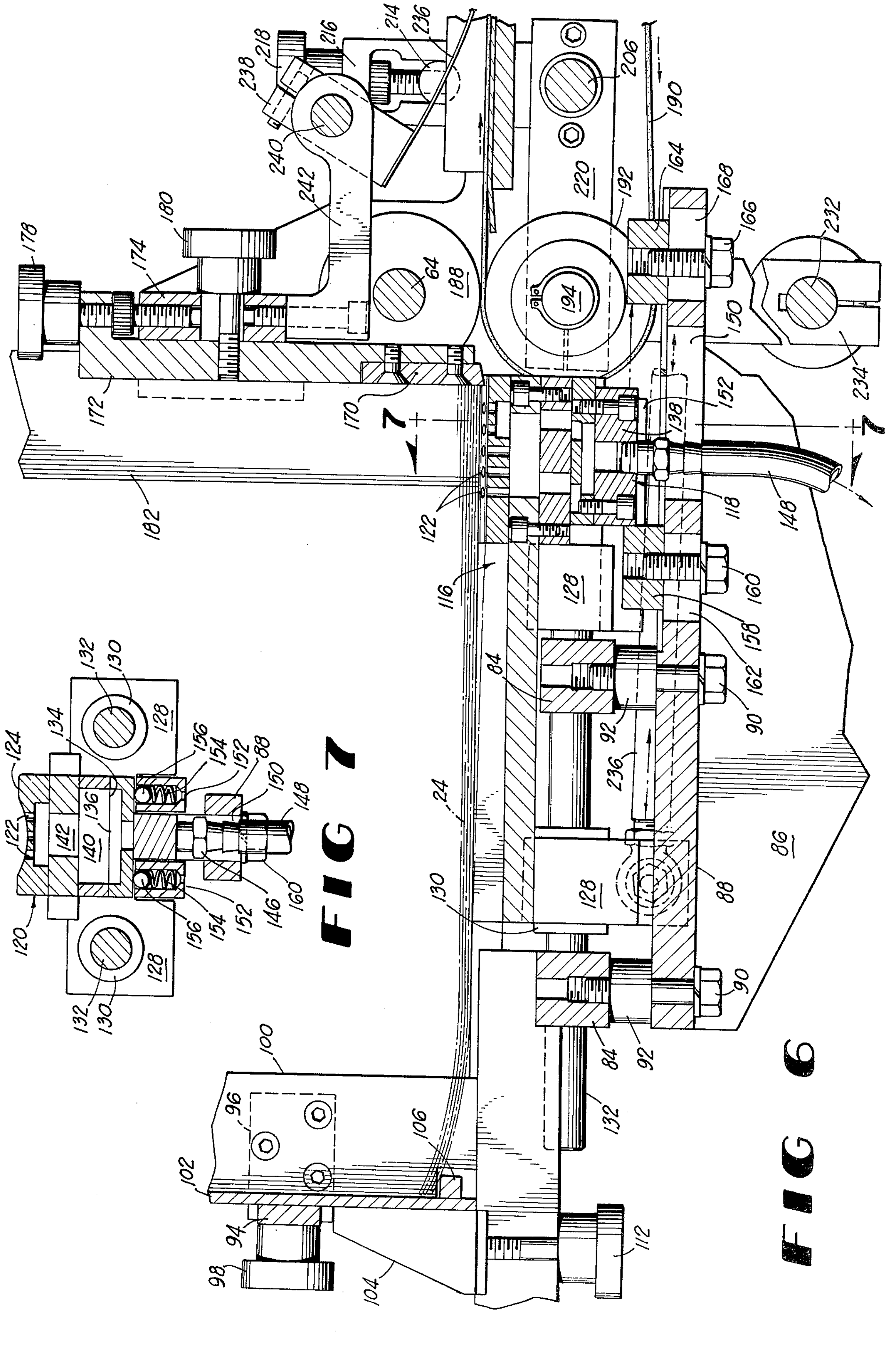
FIG. 6 is a cross-sectional view of the stacking and stripping sections of the apparatus taken along lines 6-6 in FIG. 3.
FIG. 7 is a cross-sectional view of the suction head element taken along lines 7—7 in FIG. 6.

FIGS. 3–7 show the elements comprising the ticket stacking and stripping section 12 which is located at the rear of machine 10 and includes two, horizontal, rectangular, longitudinally extending flat plates 82 that are affixed to the tops of a pair of laterally extending, spaced cross-bars 84. The cross-bars 84 are secured at their ends to the side plates 86 of upper frame assembly 58. As seen in FIG. 6, a longitudinally extending bar 88 is secured to the bottoms of cross-bars 84 by means of threaded bolts 90 which extend through spacers 92.

Means is provided for adjustably maintaining the stack 22 of tickets 24 in a vertical attitude, regardless of the dimensions of the particular tickets 24, and includes a vertical, rectangular rear wall 94 which traverses the plates 82 adjacent their ends. A pair of horizontally disposed slots (not shown) are provided through rear wall 94 to receive therein slide pins (not shown) which project outwardly from blocks 96. The pins are threadedly received within adjusting knobs 98. Upright, rectangular, equally-shaped, rigid members 100 are affixed to the inner faces of blocks 96. The members 100 curve outwardly adjacent their upper ends to facilitate the top-loading of the tickets 24. Secured midway on the inner surface of rear wall 94 is a vertical plate 102.

Figure 3:
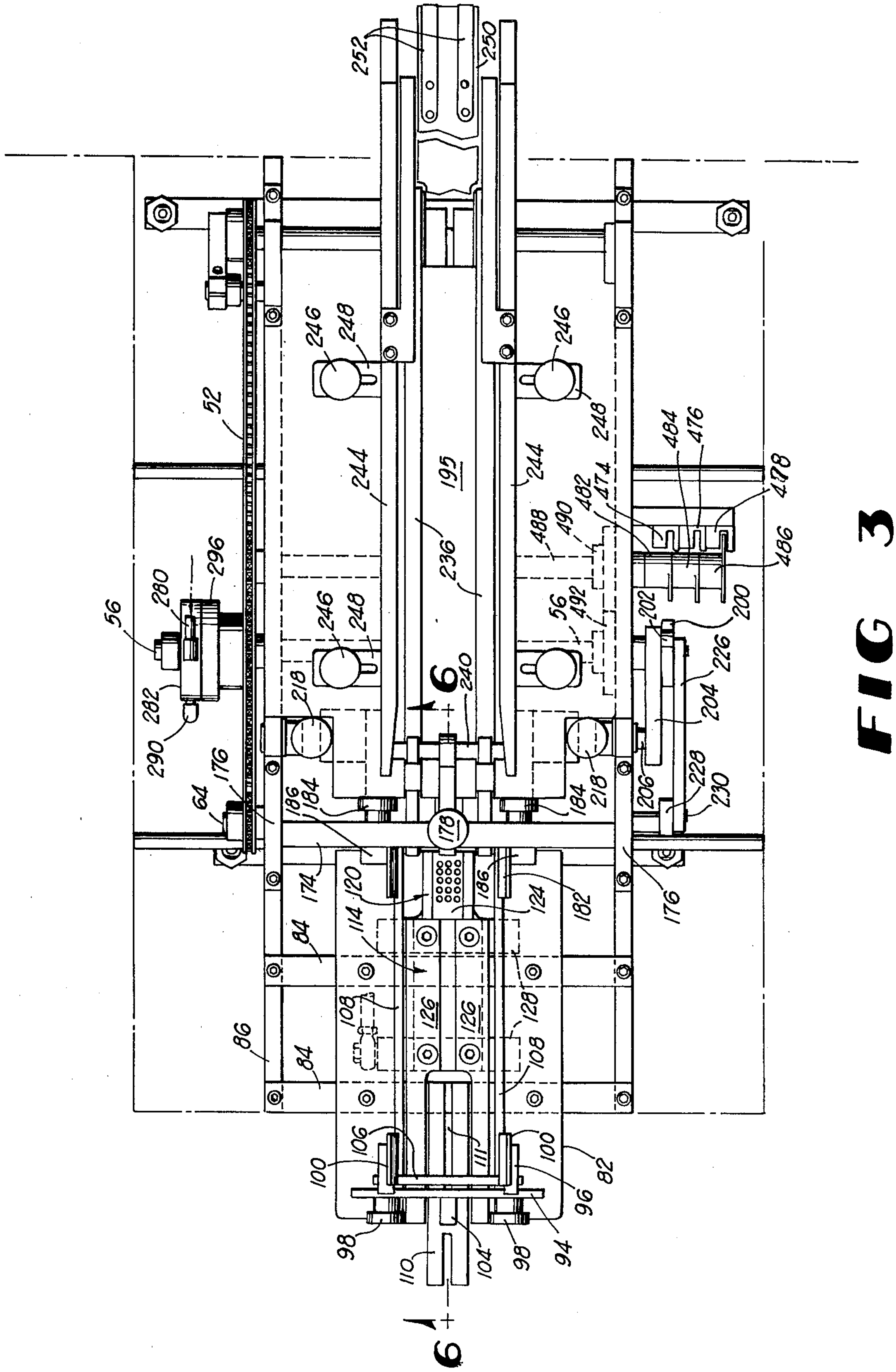
FIG. 3 is a detailed top plan view of the ticket stacking, stripping and feeding sections of the present invention.

The underside of rear wall 94 is attached to the top of a triangular-shaped block 104 which is secured to the back of vertical plate 102. A small, rectangular laterally extending ticket-separating bar 106 is secured to front face of vertical plate 102 adjacent its bottom, the bar 106 traversing the pair of longitudinally extending guide rails 108 affixed to and extending above the inner edges of plates 82. As seen in FIG. 3, a pair of spaced elongated rectangular members 110 are affixed at their forward ends to rear cross-bar 84 and horizontally extend out of the rear of the machine 10, defining a passageway 111 therebetween. The bottom of block 104 is dimensioned to be slidably received along passageway 111, the position of the block 104 being fixed by the tightening of knob 112. Thus, the longitudinal adjustment of the stacking means is provided by manipulation of knob 112. The members 100 can be laterally adjusted by means of knobs 98 to accommodate various widths of tickets 24.

The stripping is accomplished by movable suction element 114 which has an upper first portion 116 and a lower second portion 118. The first portion 116 includes at its forward end a rigid, rectangular suction head 120 having a plurality of vertical suction apertures 122 therethrough. As seen in FIG. 7, suction head 120 is slightly concave along the length of its upper surface 124 to retain thereon in gripping relationship one of the tickets 24, as described hereinbelow. Suction head 120 may be detached from element 114 and a suction head having a different contoured upper surface substituted therefor, depending on the thickness of tickets being run through the machine 10.

To the rear of suction head 120 is a ticket supporting surface formed of a pair of flat members 126 which are fixed in spaced relationship onto the tops of laterally extending slide blocks 128. The inner opposed edges of members 126 are oppositely dimensioned along their rear portions to receive therebetween the members 110 when the suction element 114 is in the ticket securing position as shown in FIG. 3. Longitudinally disposed through each of the slide blocks 128 are a pair of sleeves 130 which sliding receive therein slide bars 132 that are secured through cross-bars 84, as seen in FIGS. 6 and 7.

Valve means are associated with the suction element 114 to alternatively communicate suction to suction apertures 122 and includes the lower second portion 118 which is movable with respect to the first portion 116. As seen in FIG. 7, the suction head 120 has a flat bottom face 134 which is in opposed, sliding relationship to the upper face 136 on vacuum block 138. Vacuum ports 140 are vertically disposed through face 134 and are in flow communication through chamber 142 with suction apertures 122.

Suction openings 144 are formed through face 136 and communicate with suction nozzle 146 threaded into the bottom of vacuum block 138. A flexible hose 148 is connected at one of its ends to nozzle 146 and to a conventional vacuum pump (not shown) at its other end. The nozzle 146 extends through a longitudinal slot 150 in bar 88. A pair of channel members 152 longitudinally extend beneath vacuum block 138 and contain springs 154 with bearings 156 thereon that abut the lower surface of block 138 to urge face 136 into engagement with face 134.

As shown in FIG. 6, the suction element 114 is in the ticket securing position, with suction openings 144 in communication with vacuum ports 140. Means for moving the vacuum block 138 into flow communication with suction head 120 include a rear stop element 158 that is selectively positioned on the top of bar 88 by means of a threaded bolt 160 being slidably received through elongated slot 162 and into complementarily threaded rear stop element 158. The front of rear stop element 158 is in abutting engagement with the rear of vacuum block 138 when the section element 114 is in its ticket securing position.

Means for moving the vacuum block 138 out of suction flow communication with suction head 120 include a front stop element 164 adjustably positioned forwardly of slot 150 by means of threaded bolt 166 riding within slot 168 through bar 88. The front stop element 164 engages the front surface of vacuum block 138 when the suction element 114 is in its ticket releasing position, thereby limiting the forward movement of vacuum block 138.

A vertically oriented stripping blade 170 is secured to post 172 which is adjustable secured to cross-head 174 that is attached at its ends to vertical supports 176. The bottom surface of blade 170 is dimensioned to be complementary with the upper surface 124 of suction head 120, the spacing between the two surfaces being determined by adjustment of threaded top knob 178 and knob 180.

As seen in FIG. 3, a pair of upright members 182 are positioned exteriorally of the guide rails 108 adjacent the suction head 120 and are laterally adjustable through knobs 184 which extend through horizontal slots (not shown) in cross-head 174 into blocks 186 that are attached to the members 182. The members 182, along with members 100 and plate 102, serve to define the ticket stacking magazine area.

Ticket Feeding Section

Figure 5:
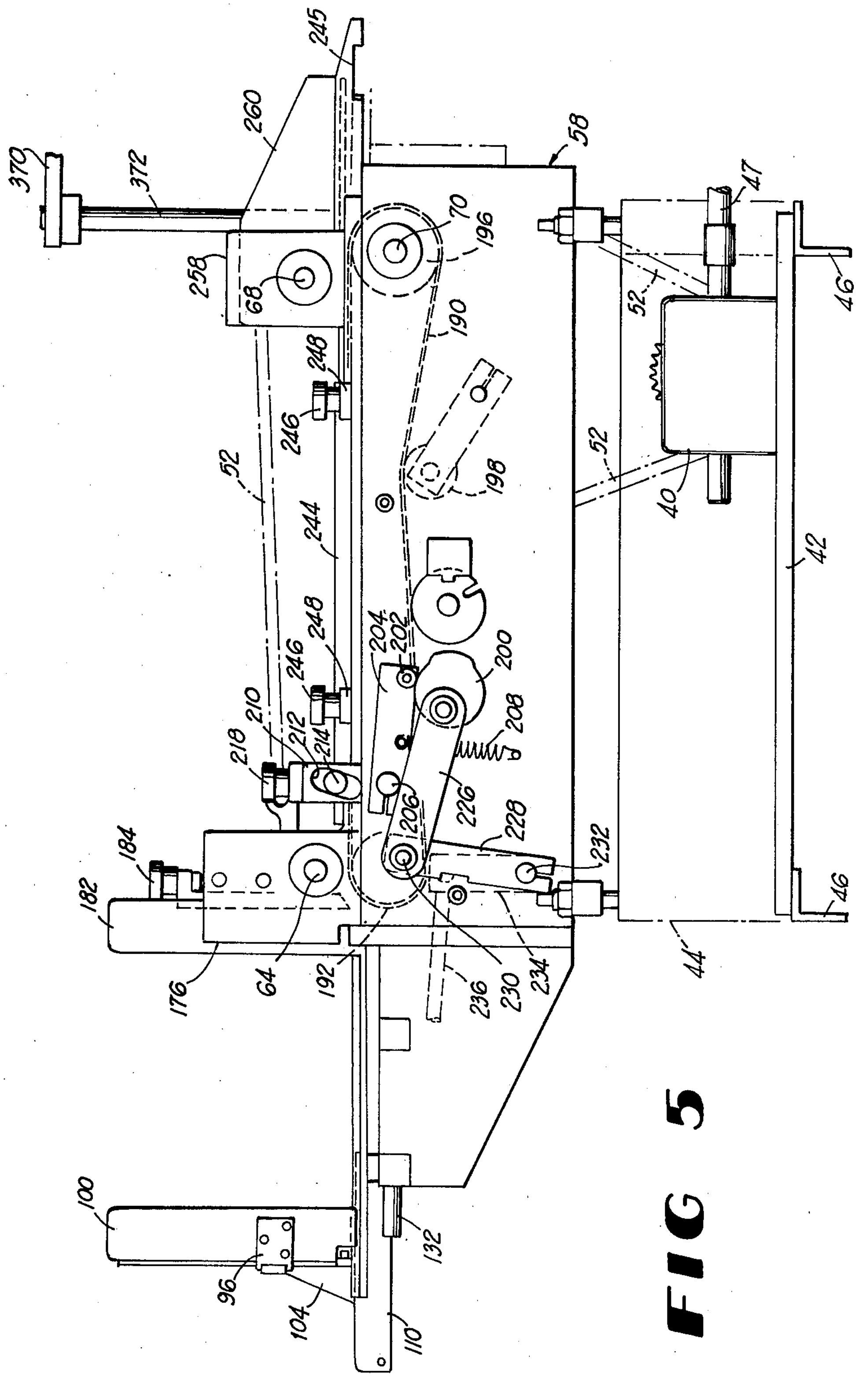
FIG. 5 is a left side elevational view of the apparatus with the gluing section omitted and with a portion of the ticket advancing section shown in phantom lines.

The ticket feeding section 14 serves to transfer the stripped ticket 24 from section 12 to the ticket lifting section 16 (FIG. 2). As seen in FIGS. 3, 5 and 6, a pair of upper rollers 188 are affixed in spaced relationship on shaft 64 that is rotably journaled through vertical supports 176 beneath cross-head 174. The upper rollers 188 are positioned over the forward end of the upper flight of a pair of longitudinally extending ticket feed belts 190 which are supported at their upstream ends on a pair of axially aligned, lower rollers 192 that are affixed to rocking shafts 194 and 194'. Referring to FIG. 5, the downstream ends of belts 190 pass over rollers 196 affixed to shaft 70. The upper flights of belts 190 extend through longitudinally extending passageways in the top 195 of upper frame assembly 58, the belts 190 being flush with top 195. An idler roller 198 is positioned to engage the lower flight of belts 190. The space between lower rollers 192 (shown in FIG. 8 as A) is sufficient to allow suction head 120 to pass therebetween when suction element 114 moves to its ticket releasing position.

Figure 8:
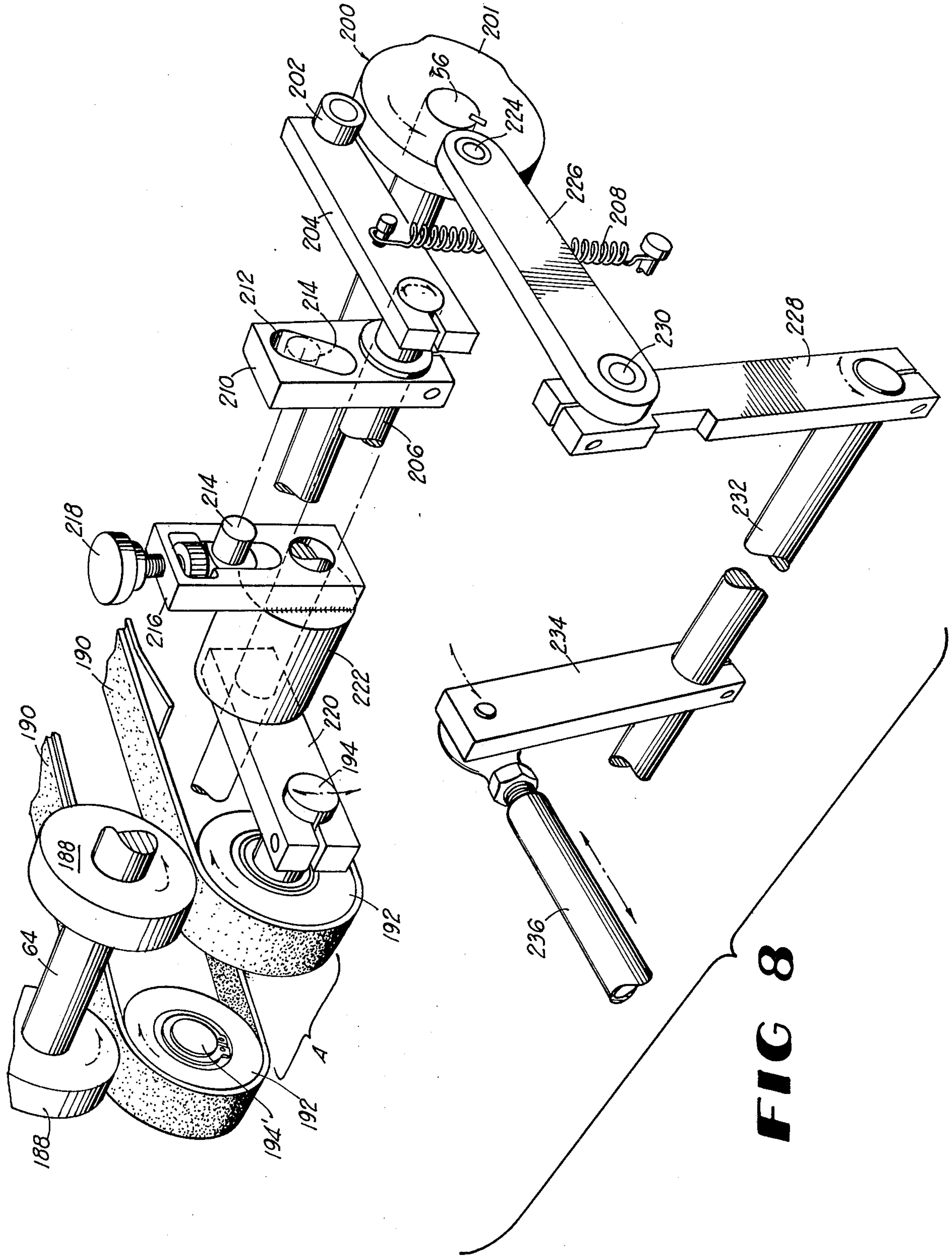
FIG. 8 is a partial, exploded perspective view of the linkage for the ticket stripping and feeding sections of the apparatus of the present invention.

The linkage for the oscillating movement of lower rollers 192 is shown in FIGS. 5 and 8. Affixed to the power input shaft 56 on the side of machine 10 opposite drive sprocket 54 is a cam 200 that has about a 30° camming surface 201 thereon which engages the cam roller 202 affixed to one end cam roller arm 204 that is secured at its other end to pivot shaft 206. The cam roller 202 is normally held against cam 200 by means of tension spring 208 attached to cam roller arm 204.

The shaft 206 passes through the bottom of an upright, rectangular block 210 that has a canted slot 212 which receives therethrough pin 214 that is vertically adjustable within block 216 by means of adjustment of knob 218, the blocks 210, 216 being in juxtaposed position. The shaft 206 continues through block 216 and has secured thereon at a position between lower rollers 192 one end of connecting arm 220, collar 222 being interposed on shaft 206 between block 216 and connecting arm 220. The shaft 194 is secured to the other end of arm 220. A similar connecting arm (not shown) attached to shaft 206 is provided for the other lower roller which rotates about shaft 194' secured thereto.

The linkage for the reciprocating movement of suction element 114 is shown in FIGS. 6 and 8. Eccentrically affixed to cam 200 by means of pin 224 is one end of crank arm 226 which is attached at its other end to link 228 by means of pin 230. A shaft 232 is affixed to the lower end of link 228 and extends across the machine 10. Crank lever 234 is affixed at its lower end to shaft 232 and has pivotally mounted to its upper end slide arm 236. The other end of slide arm 236 is pivotally connected to the rear slide block 128 of the suction element 114.

The elements of the ticket feed assembly are timed so that lower rollers 192 are moved to their most downwardly position as the suction head 120 moves between the belts 190 to its ticket releasing position and rise to grip, in cooperation with the upper rollers 188, the stripped ticket 24 as the suction head 120 begins to withdraw to its ticket securing position and feed it longitudinally along the path defined by the belts 190. The arcuate, reciprocal movement of lower rollers 192 is accomplished by the cam roller 202 engaging camming surface on cam 200 which pivots arm 204 about the longitudinal axis of shaft 206. Shaft 194, being connected to shaft 206 through arm 220, moves along the same arc as does shaft 206, thus causing lower rollers 192 to oscillate up and down.

The space between lower rollers 192 and upper rollers 188 when the lower rollers 192 is in their uppermost position is determined by adjustment of knob 218 which lowers or elevates pin 214. The lower that pin 214 is within slot 212, the greater will be the separation between the pairs of rollers 188, 192. The thicker the stock of tickets 24, the more separation is desired. The preferred position of lower rollers 192 is such that on its upward swing, the ticket 24 is gripped between the upper rollers 188 and the belts 190.

The sliding movement of suction element 114 is accomplished by link 228 oscillating about pin 230 because of the movement of crank arm 226 due to the rotation of cam 200. The oscillation of link 228, in turn, serves to rock shaft 232, thereby pulling slide arm 236 back and forth through the movement of crank lever 234. The suction element 114 is thus caused to reciprocate along a linear path along slide rods 132.

Referring again to FIGS. 3 and 6, the ticket feeding section 14 further includes a pair of metal straps 236 that overlie the belts 190. The straps 236 are attached to the bottoms of elements 238 which are adjustably secured onto laterally extending rod 240 that is attached adjacent its ends to longitudinally extending braces 242 that project outwardly from cross-head 174.

As seen in FIG. 3, a pair of guide rails 244 are disposed adjacent the upper flights of belts 236 and are laterally adjustable by means of adjustment of screw knobs 246 which allow slotted flange members 248 attached to guide rails 244 to be moved along top surface 195 in order to accommodate various widths of tickets 24. As seen in FIGS. 4 and 5, the guide rails 244 terminate above the transverse ticket advancing section 20 and are provided with notches 245 on their undersurfaces adjacent their ends.

A tongue 250 extends outwardly from the top surface 195 behind rollers 196. A pair of opposed, longitudinally extending leaf springs 252 are secured at their downstream ends to tongue 250 and bend upwardly as they approach the end of tongue 250 in order to cooperate with the ticket lifting section 16 for positive engagement of the ticket 24 therewith.

Ticket Lifting Section

Figure 9:
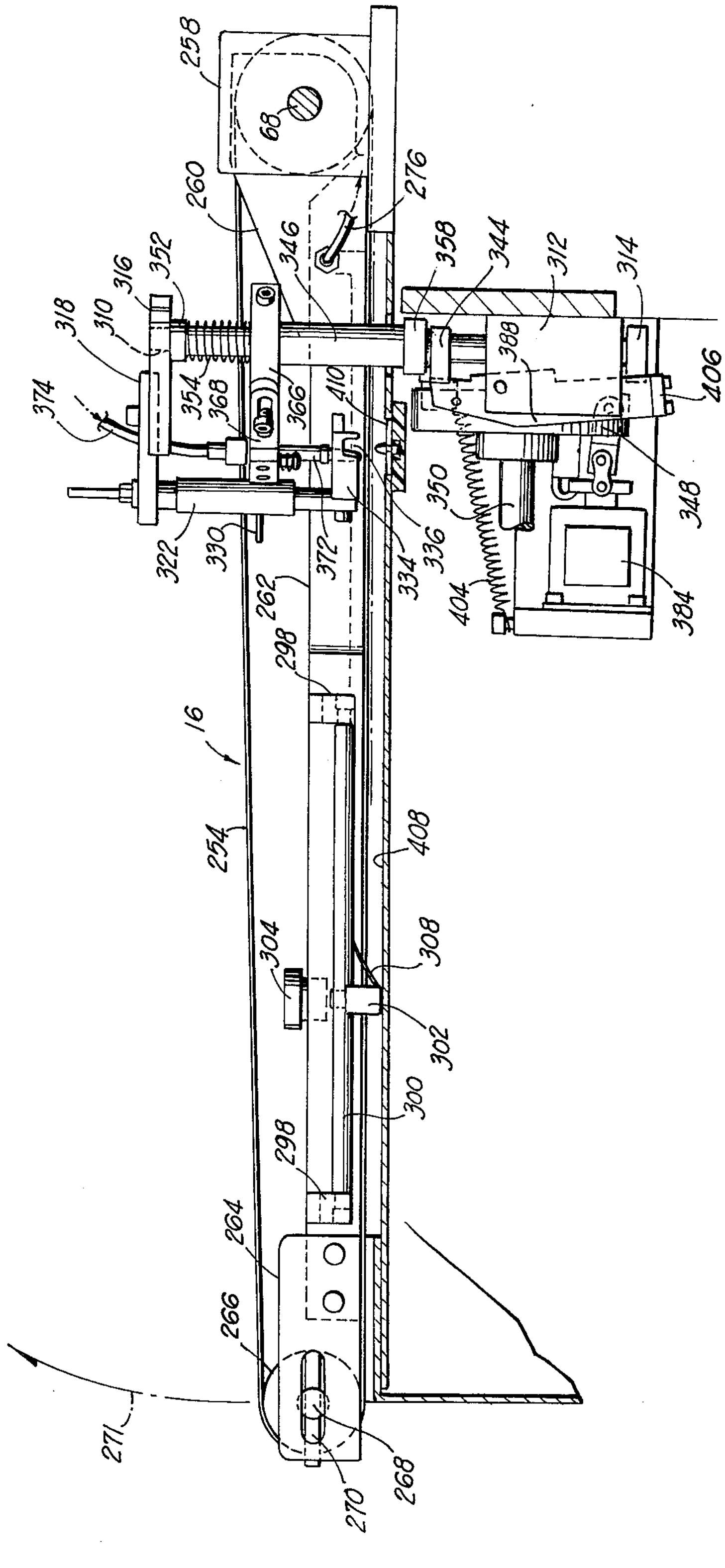
FIG. 9 is a side elevational view of an assembly drawing of the gluing and ticket lifting and advancing sections of the present invention.
Figure 10:
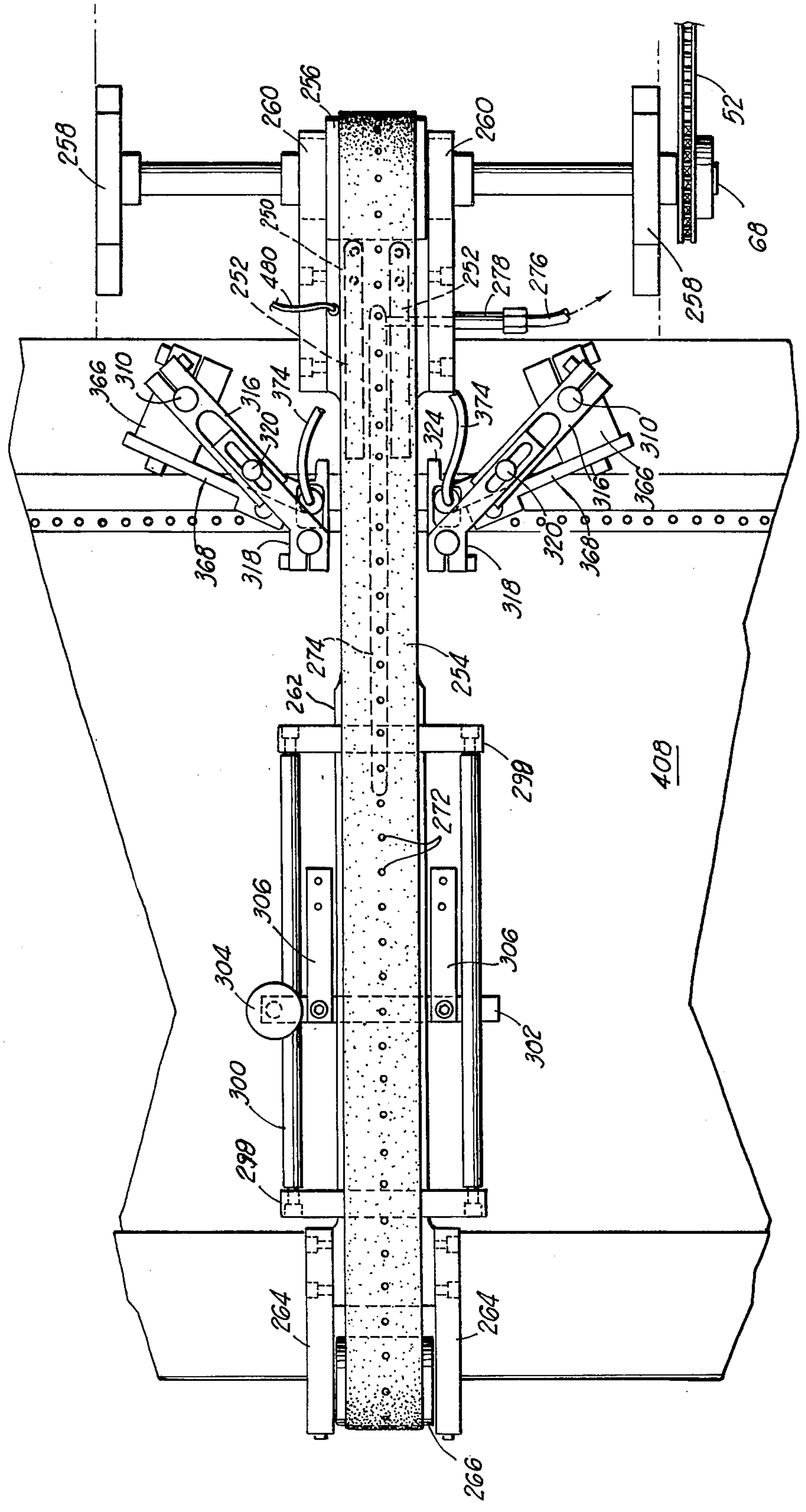
FIG. 10 is a top plan view of an assembly drawing of the view seen in FIG. 9.

Referring to FIGS. 9 and 10, the ticket lifting section 16 is located downstream and above the ticket feeding section 14 and includes an upper conveyor belt 254 that is supported at its front end by drive roller 256 that is fixed to shaft 68 which is journaled within lateral support plates 258 that extend upwardly from opposed sides of upper frame assembly 58. Longitudinally extending conveyor brackets 260 are spaced on either side of roller 256 and are journaled above shaft 68, the frame elements 260 having a downwardly sloping surface. An elongated, rectangular shaped suction manifold 262 is secured to the inside faces of brackets 260 and extends outwardly over the ticket advancing section 20. A pair of longitudinally extending plates 264 are secured about one of their ends to the end of suction manifold 262 and support therebetween at their other ends roller 266 secured to shaft 268 adjustably positioned within slots 270 in plates 264, the belt 254 passing over roller 266. Referring to FIG. 9, the entire ticket lifting section 16 is pivoted about shaft 68 for upward movement along the direction of arrow 271, for easy access to the underside of section 16.

As seen in FIG. 10, the belt 254 includes a plurality of apertures 272 longitudinally spaced along its center. A portion of the bottom of manifold 262 is provided with a longitudinally extending suction passage 274. Suction is applied through manifold 262 by means of flexible hose 276 on air fitting 278 which, as shown in FIGS. 3 and 4, is attached at its other end to nozzle 280 exteriorally mounted on the stationary portion 282 of circular suction valve 284 that is fixed on shaft 56 and is supported on the machine 10 by means of finger 286 being received in a slot on the top of support block 288 affixed to the top of lower frame assembly 44.

Figure 15:
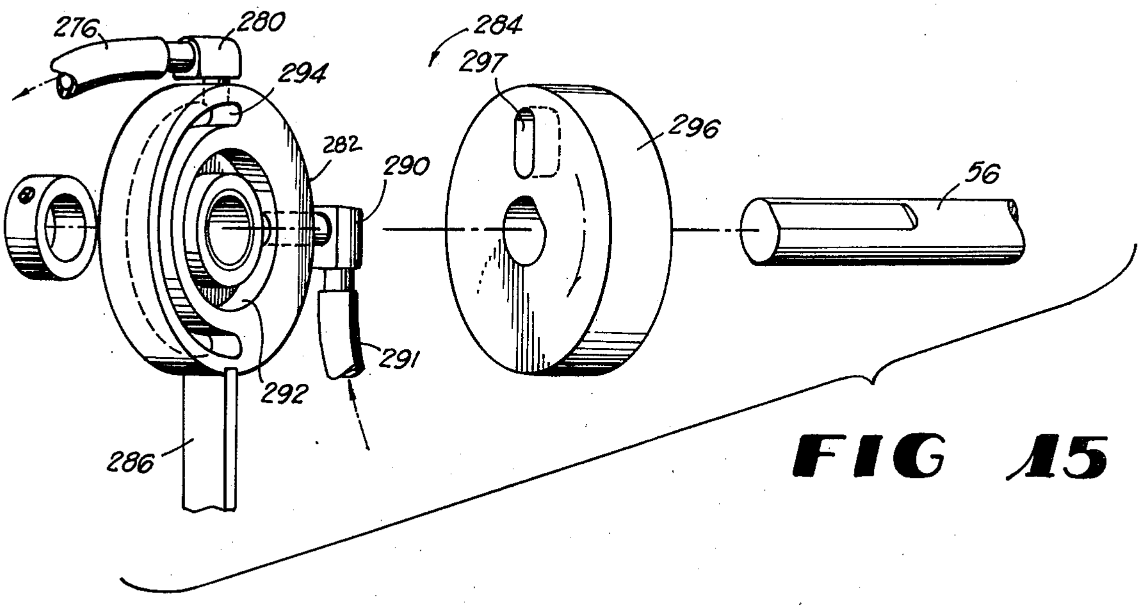
FIG. 15 is an exploded perspective view of the rotary vacuum valve of the present invention.

Referring to FIG. 15, the stationary portion 282 further includes suction port 290 that is connected by a flexible hose 291 to a conventional suction motor (not shown). The suction port 290 is in communication with a circular groove 292 formed on the inner, flat face of stationary portion 282 and nozzle 280 is in communication with an arcuate shaped slot 294 on that face which is concentric with groove 292. The rotary portion 296 of the suction valve 284 is rotably secured on shaft 56 with its inner face in juxtaposed, sliding relationship to the inner face of stationary portion 282. The inner face of the rotary portion 296 includes a large groove 297 which is dimensioned to simultaneously place groove 292 and slot 294 in flow communication with each other for the length of slot 294 during each revolution of rotary portion 296. In that manner, suction is successively applied and interrupted to the manifold 262 in timed relationship with the rotation of shaft 56 which controls the reciprocating movement of the suction element 114 and the lower rollers 192, as described above.

Referring again to FIGS. 9 and 10, an adjustable stop means is provided on the suction manifold 262 and includes laterally extending portions 298 in which are secured the opposed ends of rails 300 that longitudinally extend in opposed relationship along the exterior sides of manifold 262. Slidably affixed on rails 300 is stop bar 302 that has a lower surface which traverses the lower flight of the belt 254, that lower surface being located just above the surface of the ticket advancing section 20, as seen in FIG. 9. The stop bar 302 is selectively positioned along rails 300 by means of adjustment of knob 304.

As seen in FIG. 10, rigid elements 306 secured at one of their ends to the stop bar 302 between the rails 300 and the sides of the suction manifold 262 and extend rearwardly. Referring to FIG. 9, a thin metal strap 308 is attached to the distal end of each of the rigid elements 306 and curves downwardly toward the stop bar 302 until it terminates adjacent the lower surface of the stop bar 302.

Gluing Section

The gluing section 18 is shown in FIGS. 4 and 9–11 and includes a pair of stanchions 310 which are journaled through rectangular slide posts 312 and are secured at their bottom ends to transversely extending bottom plate 314. Secured at the top of each stanchion 310 is a laterally extending plate 316 having a bifurcated outer end which slidably receives therein connecting arm 318 which is secured into the desired position by adjustment nut 320.

Figure 11:
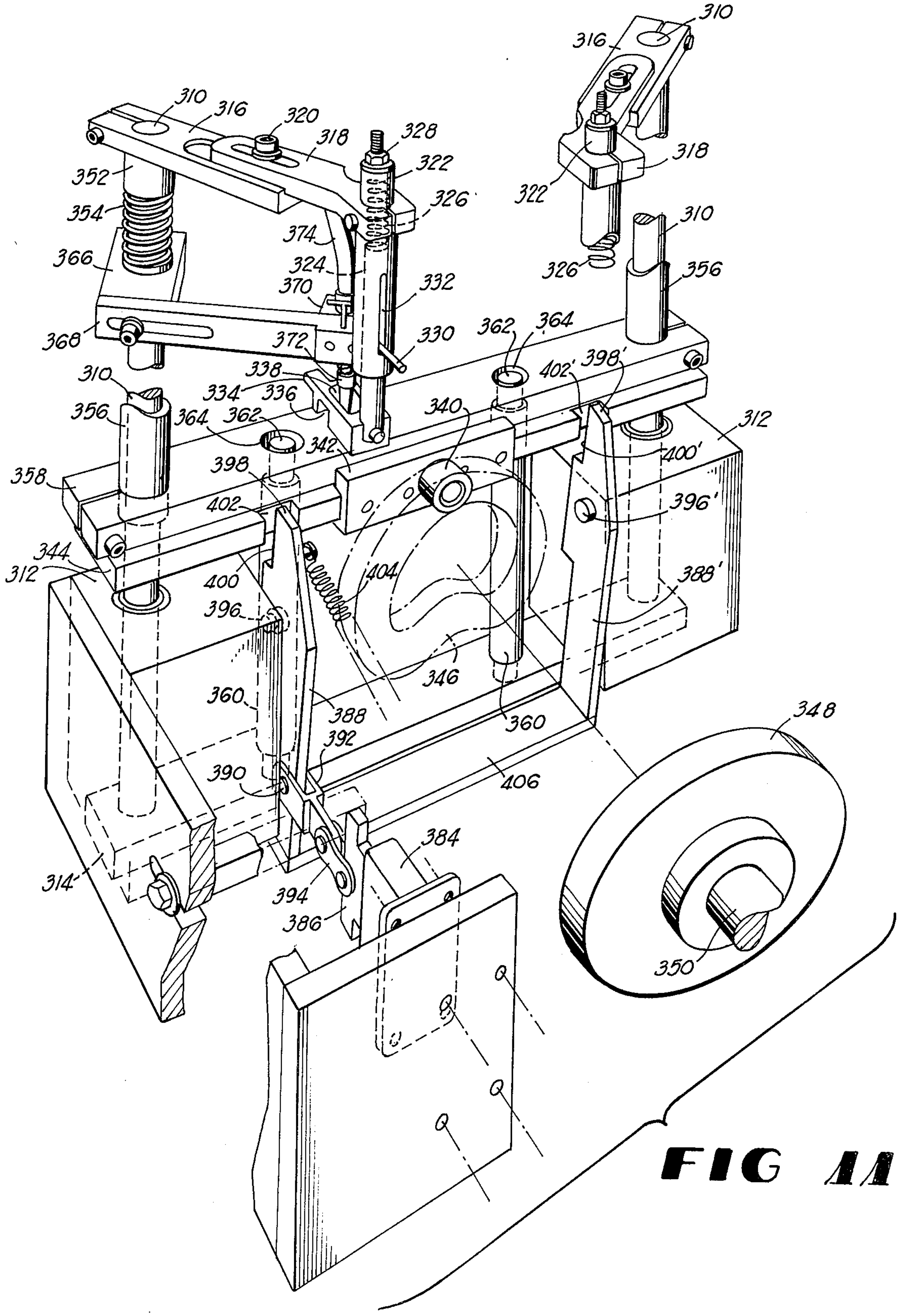
FIG. 11 is an exploded, partial perspective view of the gluing section and associated linkage with certain parts broken away for clarity.

Vertically supported at the free end of each connecting arm 318 is a small cylinder 322 in which is biased rod 324 by means of spring 326 that is fixed in position by means of abutment nut 328. A laterally extending pin 330 projects outwardly from rod 324 through slot 332 vertically disposed through cylinder 322. As seen in FIGS. 9 and 11, a foot 334 is attached to the lower end of the rod 324 and extends outwardly over the ticket advancing section 20. A laterally extending open-channel 336 is formed through the foot 334 adjacent its end and is detailed to allow the pins of the pin belt (to be described hereinbelow) to pass therethrough. A longitudinally extending glue nozzle receiving slot 338 is disposed through the foot 334.

Figure 12:
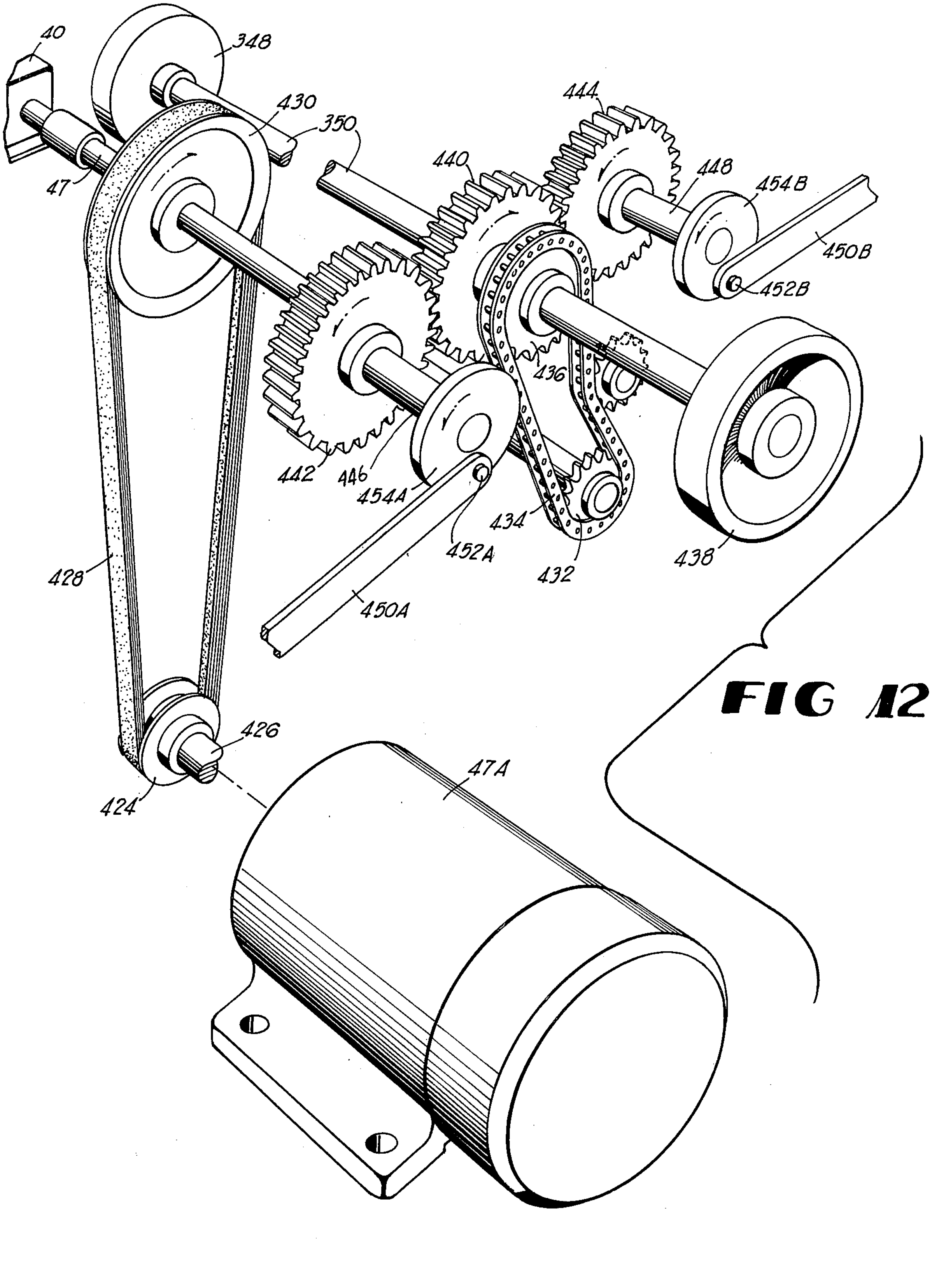
FIG. 12 is a partial, perspective view of the drive train for the ticket advancing section.

As seen most clearly in FIG. 11, reciprocating, vertical movement of the foot 334 is accomplished by cam roller 340 longitudinally projecting from block 342 that is secured to laterally extending foot actuator bar 344, the roller 340 seated within heart-shaped race 346 on the inner face of large cam 348 affixed to rotary shaft 350 that traverses the ticket advancing section 20 and is operatively connected to the motor 47A, as seen in FIG. 12. The stanchions 310 pass through and are secured to foot actuator bar 344.

Movement of the glue heads is provided by having collar 352, which is secured to each stanchion 310 beneath plate 316, engage at its lower end compression spring 354 that abuts at its lower end the top of sleeve 356 concentrically disposed in sliding relationship to the exterior of stanchion 310. The bottom of the sleeve 356 is secured within glue actuator bar 358 that is disposed above the foot actuator bar 344. Elongated, vertical guide pins 350 are secured at their bottom ends to the top of bottom plate 314 and extend through foot actuator plate 344, terminating in smaller diameter tops 362 that extend through holes 364 formed in glue actuator bar 358.

A rectangular-shaped block 366 is affixed to the top of each sleeve 356 and slidably attached thereto arm 368 which terminates in glue-head receiving plate 370 through which extends spring-biased glue nozzle 372. A conventional ball check valve (not shown) is mounted at the lower extremity of the glue nozzle 372 and is normally maintained in a closed position by means of spring (not shown) within the nozzle 372. When the glue nozzle 372 is lowered so that the ball check valve engages the top surface of the ticket 24, a small amount of glue is discharged from the glue nozzle 372 to form a spot on the ticket 24.

As seen in FIG. 4, the glue is received into the top of the nozzle 372 through a flexible glue conduit 374 that is attached to a dispensing valve 376 connected to the bottom of a closed glue reservoir 378. The reservoir 378 is supported above the gluing section 18 by means of horizontal arm 380 that is secured to the top of post 382 that extends upwardly from the upper frame assembly 58 adjacent one of the brackets 260.

Referring to FIG. 11, it can be seen that the rotation of cam 348 causes cam roller 340 to travel within race 346, inputing a reciprocating vertical movement to foot actuator bar 344. Stanchions 310, being secured to foot actuator bar 344, also travel up and down, that movement being communicated to foot 334 through the connecting linkage provided by plate 316, arm 318 and rod 324. The spring 322 insures that no undue pressure is applied to ticket 24 by foot 334 on its downward travel.

On the down stroke of the foot actuator bar 344, the collar 352, being secured to stanchion 310, presses downwardly through spring 354 onto sleeve 356 which lowers the glue nozzle 372 through block 366 and arm 368. A spring (not shown) is biased about the exterior of the nozzle 372 between the bottom of the plate 370 and the nozzle 372 to cushion the downward movement of the nozzle 372 against the ticket 24.

Means is associated with the gluing section 18 to interrupt the stroke of the glue nozzle 372 once a predetermined number of consecutive strokes of the gluing mechanism is accomplished. The interrupting means includes solenoid 384 having movable armature 386. A trigger 388 is pivotally connected to armature 386 through pin 390 in yoke 392 that, in turn, is pivotally attached to armature 386 by link 394. The trigger 388 is pivotally connected to slide block 312 through pin 396 adjacent the flat top 398 of trigger 388. The inner edge of the trigger 388 is provided with a notch 400 that receives therein vertically aligned slot 402 formed through foot bar 344. A spring 404 normally maintains the trigger 388 in its inoperative position with notch 400 out of engagement with slot 402. A similarly detailed trigger 388′ is pivoted on the other slide block 312 through pin 396′ and is connected to trigger 388 by means of cross-head 406, the foot plate 344 having a slot 402′ in alignment with notch 400′ on trigger 388.

When the solenoid 384 is actuated, the triggers 388, 388′ are pivoted forward to their operative positions about respective pins 396, 396′ through the rearward movement of the armature 386, link 394 and yoke 392 so that the tops 398, 398′ are in abutting engagement with the underside of glue actuator bar 358, thereby limiting the continued downward movement of glue actuator bar 358. The sleeve 356, being affixed to the glue actuator bar 358, will remain stationary, thereby preventing the downward stroke of the glue nozzle 372. However, the foot actuator bar 344 will continue to reciprocate, also causing the foot 334 to continue to move up and down. When the solenoid 384 is de-actuated, the triggers 388, 388' return to their inoperative positions, allowing the glue actuator bar 358 to continue to vertically reciprocate and to allow glue nozzles 372 to deposit glue on the tickets 24.

Ticket Advancing Section

The ticket advancing section 20 is shown in FIGS. 2, 9, 10 and 12 and includes a rigid top with a horizontal upper ticket receiving surface 408 that extends in a direction that is lateral to the path of the conveyor belts 190 and the suction conveyor belt 254. A longitudinally extending passageway 410 is formed in the surface 408 to receive therethrough the upper flight of pins 412 carried on an endless belt 414. The space of the pins 412 along belt 414 is equal to the spacing of the apertures 34 in the ticket 24, as shown in FIG. 13.

Figures 13, 14:
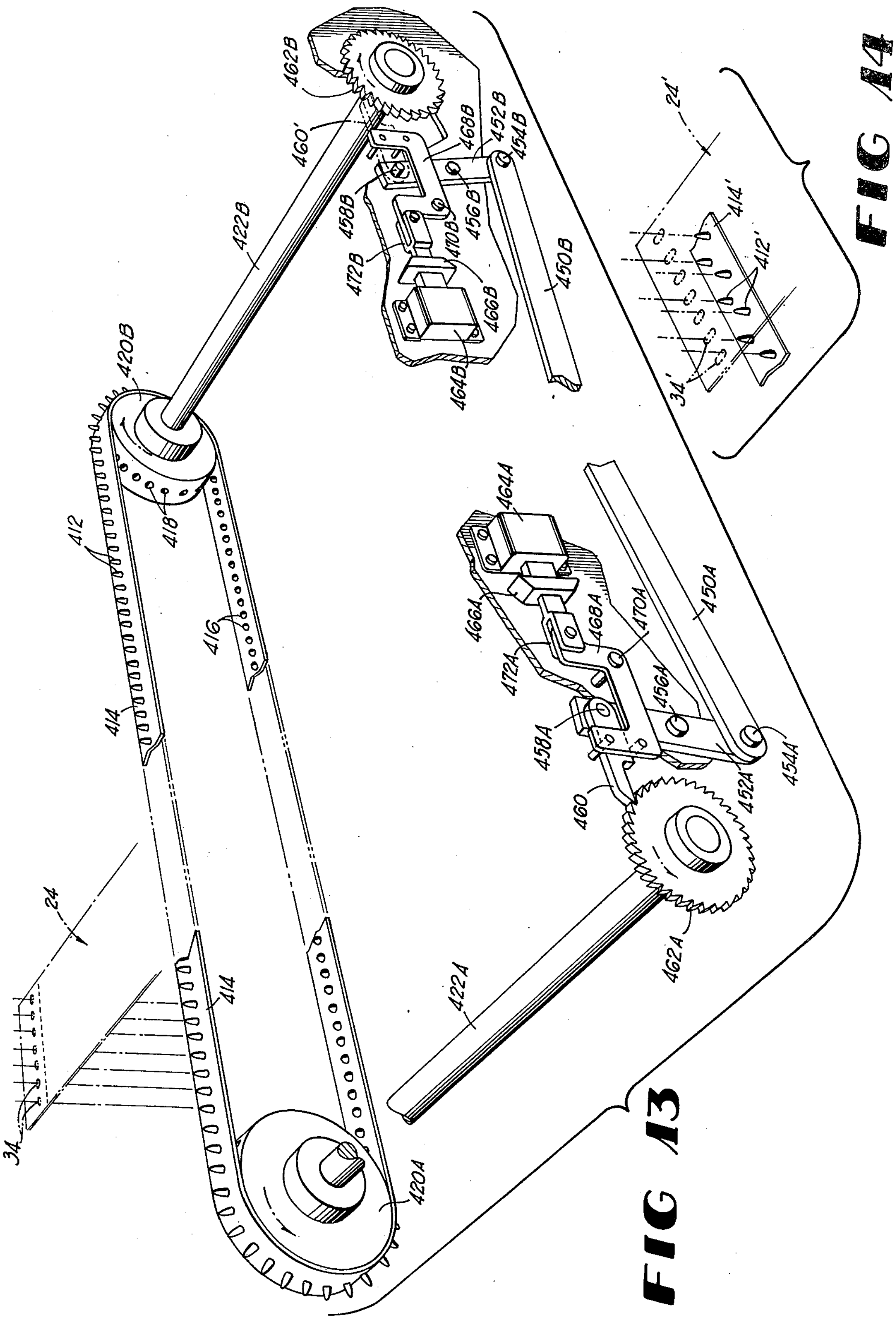
FIG. 13 is a partial perspective view of the pin belt conveyor drive assembly.
FIG. 14 is an alternate embodiment of the pin belt of the present invention.

An alternate embodiment of the pin belt is designated as 414' in FIG. 14 and has a staggered configuration of pins 412' which are received in elongated apertures 34' formed in ticket 24'.

Referring to FIG. 13, the bottom surface of pin belt 414 has spaced protrusion 416 which are in alignment with pins 412 and which are complementarily dimensioned to be received within the indentations 418 on rollers 420A, 420B at the opposed ends of the belt 414. The rollers 420A, 420B are carried on transverse roller shafts 422A, 422B for oppositely directed rotation by the drive train shown in FIG. 12.

A drive pulley 424 is secured onto power shaft 426 extending from motor 47A and carries a pulley belt 428 that extends over driven pulley 430 mounted on shaft 47 that has one of its ends projecting into the gear box 40. A drive sprocket 432 is affixed to the other end of shaft 47 and carries drive chain 434 which passes over driven sprocket 436 mounted on shaft 350 to which large cam 348 is affixed at one of its ends. A manual turning wheel 438 is fixed on the opposite end of shaft 350 exteriorally of the machine 10. A drive gear 440 is secured on the shaft 350 for simultaneous meshing engagement with driven gears 442 and 444, gear 442 being on stub shaft 446 and gear 444 being on stub shaft 448.

Crank arms 450A, 450B are mounted, at one of their ends, about pins 452A, 452B eccentrically disposed on circular gears 454A, 454B, respectively, that are affixed to ends of shafts 446, 448, respectively. Referring to FIG. 13, the crank arms 450A, 450B are secured at their other ends to arms 452A, 452B through pins 454A, 454B. The arms 452A, 452B pivot about connection 456A, 456B and have pins 458A, 458B for detachably mounting thereon a pawl 460. The pawl 460 is shown on pin 458A for engagement with ratchet wheel 462A fixed to shaft 422A. A similar ratchet wheel 462B is secured on the end of shaft 422B.

The direction in which pin belt 414 travels, and hence whether there is "Style 1" or "Style 2" shingling occuring is determined by whether pawl 460 is mounted on pin 458A or 458B. Through the drive train shown in FIG. 12 and described above, the arms 452A, 452B are continuously oscillating about their connection points 456A, 456B. With ratchet 460 in pin 458A, the ratchet wheel 462A will be engaged, turning shaft 422A and roller 420A and belt 414 in a first direction. If the pawl 460 is mounted on pin 458B to assume the position designated in phantom lines as 460', then the pin belt 414 will be made to travel in a second direction, opposite to the first direction, by having the pawl 460' engage the ratchet wheel 462B.

Means is provided for interrupting the engagement of either pawl 460 or 460' with respective ratchet wheel 462A or ratchet wheel 462B and include solenoid 464A, 464B which have armatures 466A, 466B. Pawl frames 468A, 468B are pivotally mounted through pins 470A, 470B and engage at one of their ends the pawl 460 or 460'. The frames 468A, 468B are connected to pawl solenoids 464A, 464B through links 472A, 472B. Actuation of pawl solenoids 464A, 464B will lift pawl 460 or 460' out of engagement with ratchet wheels 462A or 462B, respectively, thereby stopping the movement of the pin belt 414.

Referring again to FIG. 12, it can be seen that, when motor 47A is off, the pin belt 414 can be manually advanced either to the left or the right by turning wheel 438 in the desired direction.

Photocell

Referring to FIG. 3, a photocell (not shown) is disposed along the path of the ticket feeding section 14 and is electrically connected to switches 474, 476 and 478 through wire 480 seen in FIG. 10. The switches 474, 476 and 478 have cam rollers (not shown) that ride on cams 482, 484, and 486, respectively, that are mounted on shaft 488. A gear 490 is mounted on shaft 488 and is in meshing engagement with gear 492 on drive shaft 56.

Switch 474 is actuated to turn off the motor 47A when the photocell senses dark although the rotary cycle of cam 482 is completed, meaning that the tickets 24 are jammed within the machine 10. A start button (not shown) must be pushed to reactivate the motor 47A.

The switch 476 is connected to the glue solenoid 384 and is actuated to interrupt the downward stroke of glue actuator bar 358 when the photocell registers that a predetermined number of tickets 24 have passed and, thus, have been shingled into a bank of desired length. The gluing is then interrupted, normally only for the advancement of one ticket 24 on the ticket advancing section 20.

When there has been a misfeed, i.e., when the ticket stripping section 12 fails to strip a ticket 24 from the bottom of stack 22, the photocell will sense that condition and switch 486 will be closed to actuate the glue solenoid 384 as well as the pawl solenoids 464A, 464B, thereby pulling pawl 460 or 460' out of contact with ratchet wheels 462A or 462B, stopping the movement of the pin belt 414. Stopping the advancement of the tickets 24 through the machine 10 until the condition is corrected maintains the synchronization of the serially numbered tickets to be shingled. Once the misfeed is corrected, the switch 486 is opened, allowing continued operation of the gluing mechanism and the pin belt 414.

Operation

With the tickets 24 placed in the magazine area to form a stack 22, the motor 47A is turned on and, through the linkage and suction connections, previously described, the suction element 114 begins to reciprocally move beneath the stack 22 to serially strip therefrom the bottommost ticket 24. As seen schematically in FIG. 16A, the initial placement of the suction element 114 is in its rearward ticket securing position underlying the stack 22. Referring to FIG. 6, the rear edge 28 of the tickets 24 engage the ticket-separating bar 106 in order to aid in the dislocation of one ticket from another due to the paper surrounding the apertures 34 being stuck to the adjacent tickets 24.

With the suction element 114 in its ticket securing position, suction is applied through suction apertures 122 by means of the lower second portion 118 being in flow communication with respect to the suction head 120 on the upper first portion 116. The lowest ticket 24 in the stack 22 is pulled downwardly onto the upper surface 124 and assumes the concave configuration of that surface 124. The space which is between the opposed sides of the members 126 and which is rearward of the suction head 120 cooperates to allow the ticket 24 to assume a concave shape along the majority of the length of the ticket 24. The suction head 120 is dimensioned so that the sides 30, 32 of the ticket 24 extend beyond the sides of the suction head 120 along its length. Also, the suction head 120 provides an even distribution of suction pressure along its surface 124.

Figure 16:
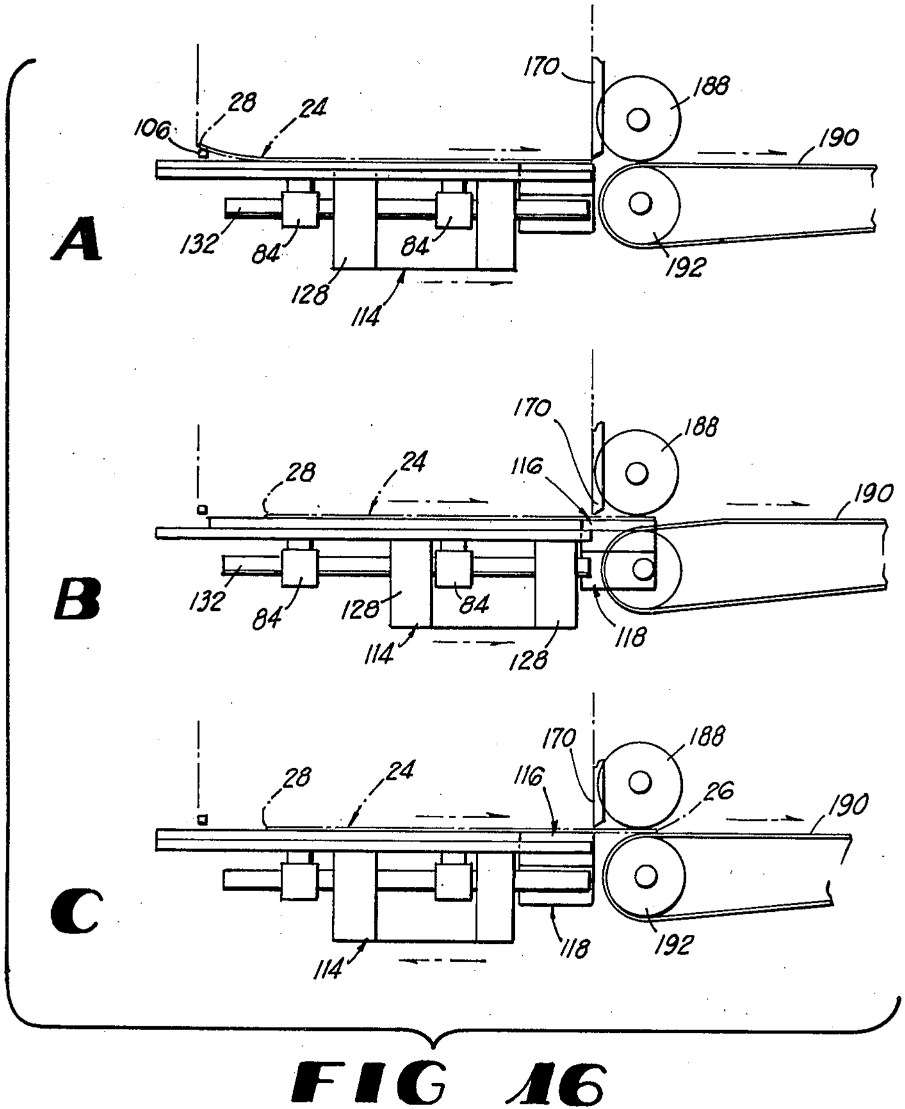
FIGS. 16 A–C are schematic side elevational views of the relationship of the suction element and the upstream end of the ticket feeding section during the stripping of a ticket.

As the suction element 114 begins to slide forward, the stripping blade 170 insures that only one ticket 24 is removed from the stack 22 with the space between the bottom of blade 170 and the surface 124 being only enough to allow only one ticket 24 at a time to pass therebetween. Referring to FIG. 16B, the lower rollers 192 begin to swing down as the suction element 114 advances and suction head 120 passes within the lateral space A between the rollers 192.

As the suction element 114 approaches its ticket releasing position shown in FIG. 16B, the front of the vacuum block 138 engages the front stop element 164, preventing the further forward movement of block 138 but allowing the upper first portion 116 with suction head 120 thereon to continue forward. Suction communication is then broken between the block 138 and suction apertures 120 so that when the lower rollers 192 rise to their ticket gripping position in conjunction with the upper, fixed rollers 188, the ticket 24 is no longer in suction engagement with the head 120 and the ticket 24 may be removed from the suction element 114.

Once the ticket 24 is gripped between the rollers 188, 192, the suction element 114 begins to reverse its direction (FIG. 16C). When the rear face of the suction block 138 hits the rear stop element 158, the faces 136, 134 slide into flow communication to allow suction to be again applied through apertures 122 to the next, bottommost ticket 24 to repeat the cycle.

The stripped ticket 24, with its edge 26 leading, is fed along the patch of the conveyor belts 190 and is held down by the overhead metal straps 236. When the ticket 24 passes over the leaf springs 252 on tongue 250, it is urged upwardly into engagement with the bottom flight of the upper conveyor belt 254. The rotary suction valve 284 is timed to apply suction through the suction passage 274 of the manifold 262 and through the apertures 272 in the continuously moving belt 254 just as the ticket 24 moves into engagement with the belt 254. The ticket 24 is lifted upwardly so that its top surface abuts the lower flight of the belt 254. The ticket 24 is carried over surface 408 of the ticket advancing section 20 until the forward edge 26 of the ticket 24 contacts the straps 308 on the adjustable stop means. The ticket 24 then begins to be directed downward toward the surface 408 in timed relationship to the suction being interrupted to the suction manifold 262 by the rotary suction valve 284.

In the embodiment of the present invention wherein there is no suction being applied by the overhead conveyor, the ticket 24 is maintained in engagement with the lower face of the conveyor belt by means of friction. The straps on the adjustable stop means help to break the frictional grip between the belt and the ticket.

The stop bar 302 is positioned so that the apertures 34 on ticket 24 are in registration with the pins 412 on the pin belt 414 when the forward edge 26 engages the curved section of the straps 308. The ticket 24 is then deposited onto the surface 408 with the pins 412 protruding up through apertures 34.

At that point, the glue nozzles 372 and feet 334 are timed to move downward so that two glue spots are placed on the ticket 24 between rear edge 28 and the apertures 34. Just as the glue nozzles 372 rise on their upward stroke, the pin belt 414 begins to move an increment. With the feet 334 being retained in engagement with the ticket surface and glue nozzles 372 still being in contact with the ticket 24, the movement of pin belt 414 causes the glue that is deposited to be smeared slightly, giving a larger adhesive surface for contacting the succeeding ticket 24. The feet 334 remain on the ticket surface a fraction behind the lifting of the glue nozzles 372 to insure that the ticket 24 does not adhere to the tips of the nozzles 372 as they rise.

The photocell is connected to a comparator circuit so that when a pedetermined number of tickets 24 has been assemnbled into a bank, the glue solenoid 384 is energized so that the reciprocating movement of the glue nozzles 372 will be interrupted. Glue is then not applied to the last of the counted tickets 24 and is thereby not secured to the succeeding ticket 24. That provides a break in the tickets 24 to form either bank 38A or 38B.

The machine 10 is adaptable to any type of ticket stock. For instance, since lighter stock has a greater deflection when pulled down upon surface 124 of suction head 120, the head 120 can be of a different, less concave configuration than for thicker stock. The gate feed of the stripping blade 170 may be similarly adjusted.

The bottom feed of the present invention insures that each bottommost ticket is flat due to the weight of remaining tickets and is thereby available for having suction applied thereto. With conventional top-feed shingling machines, the tickets may bow up and the suction fingers have difficulty in grasping the tickets.

In the prior art devices, the average shingling rate is about 6,000–9,000 tickets/hour. However, with the machine 10, the feed rate can be increased upwards to 18,000–20,000 tickets/hour. For instance, with heavy check stock (24 or 26 pound bond), the average feed rate through the machine 10 is 16,000/hour. With receipts (15 pound bond), the machine 10 has averaged 12,000–13,000 tickets/hour.

What I claim is:

1. An apparatus for forming a bank of tickets from a supply of tickets, comprising:

(a) a frame;

(b) means on said frame for stacking said supply of tickets in an upstanding, juxtaposed orientation;

(c) means on said frame for sequentially stripping the bottommost of said tickets from said supply of said tickets;

(d) means on said frame for mating a selected number of the stripped tickets in adhesive cooperation, said mating means being remote from said stripping means;

(e) means on said frame for transferring said stripped tickets from said stripping means to said mating means; and (f) power means for said stripping means, mating means and said transferring means, wherein said stripped tickets are transferred from said stripping means to said mating means along a first direction and further including means on said frame for advancing away from said mating means in a second direction said selected number of stripped tickets mated in adhesive cooperation, said second direction being transverse to said first direction, said advancing means operatively connected to said power means.

2. An apparatus as claimed in claim 1 wherein said advancing means is capable of advancing in a third direction said selected number of stripped tickets mated in adhesive cooperation away from said mating means, said third direction being oppositely directed from said second direction.

3. An apparatus as claimed in claim 1 wherein said stacking means has a bottom and wherein said stripping means includes a movable suction element disposed on said frame along said bottom, means on said frame and connected to said power means for reciprocally driving said suction element from a ticket securing position beneath said ticket stacking means to a ticket releasing position remote from said ticket securing position, means for applying suction through said suction element and valve means operatively associated with said suction element so as to alternatively allow suction to be applied through said suction element in said ticket securing position and to prevent suction from being applied in said ticket releasing position.

4. An apparatus as claimed in claim 3 wherein said suction element comprises a first portion and a second portion which is movable with respect to said first portion, said first portion comprising a rigid suction head, said suction head having a plurality of suction apertures therethrough which are in selective flow communication with said suction applying means, said suction head being dimensioned to retain thereon in gripping relationship one of the tickets.

5. An apparatus as claimed in claim 4 wherein said suction head has a first face thereon and said second portion has a second face thereon which is in opposed and sliding relationship to said first face, wherein means are on said first and second faces for providing selective suction communication between said suction applying means and said suction apertures and wherein means are provided for moving said second portion between a first position wherein said suction apertures are in communication with said suction applying means and a second position wherein said suction apertures are out of communication with said suction applying means.

6. An apparatus as claimed in claim 5 including a pair of opposed, longitudinally extending slide bars on said frame and wherein said movable suction element includes a carriage slidably journaled on said slide bars, said suction element including a flat ticket support surface adjacent said suction head, and wherein said second portion is slidably positioned on said carriage between said first position and said second position.

7. An apparatus as claimed in claim 5 wherein said providing means includes a first suction channel on said first face in flow communication with said suction apertures and a second suction applying means.

8. An apparatus as claimed in claim 21 wherein said suction element reciprocates along a linear path and wherein said moving means comprise a first rigid element disposed within said path adjacent said first position and a second rigid element disposed within said path adjacent said second position.

9. An apparatus as claimed in claim 4 wherein said transferring means includes a pair of opposed, spaced longitudinally extending conveyors, said conveyors having an upstream end and a downstream end, said upstream end being adjacent said ticket releasing position and said conveyors defining said first direction and wherein said transferring means further includes a shaft on said frame disposed above and traversing said upstream end, a pair of spaced fixed rollers concentrically disposed on said shaft in alignment with each of said conveyors, said shaft being operatively connected to said power means to rotate said rollers.

10. An apparatus as claimed in claim 9 wherein each of said conveyors has an upper flight and wherein means is provided on said frame for reciprocating said upstream end of the said conveyors about a laterally extending axis between a first position wherein said upper flight cooperates with said fixed rollers to grip said ticket therebetween and a second position which is below and remote from said first position.

11. An apparatus as claimed in claim 10 wherein said transferring means further includes an element spaced above the length of each of said conveyors for directing said ticket into positive engagement with said upper flight.

12. An apparatus as claimed in claim 10 wherein said upstream end reciprocates to said first position when said suction element is in said ticket releasing position.

13. An apparatus as claimed in claim 12 wherein said ticket has a forward section which is in suctional engagement with said suction head and wherein said suction head is dimensioned to be slidably received between said conveyor at said upstream end when said suction element is in said ticket releasing position, said forward section of said ticket having opposed sides which extend beyond said suction head, said sides being gripped by said upper flight and said fixed rollers when said upstream end of said conveyors is in said first position.

14. An apparatus as claimed in claim 9 wherein said mating means is located adjacent said downstream end of said conveyors and includes a ticket receiving surface along said second direction, said mating means including a pair of glue nozzles supported above said ticket receiving surface, means connected to said power means for reciprocally moving said glue nozzles along a vertical path from an inoperative upper position to a lower glue depositing position on said ticket when said ticket is on said ticket receiving surface.

15. An apparatus as claimed in claim 14 wherein said mating means further includes a rigid foot associated with each of said glue nozzles and means connected to said power means for reciprocally moving said feet independently of said glue nozzles from said inoperative position to said glue depositing position, said feet contacting said ticket on said ticket receiving surface as said glue nozzles return from said glue depositing position to said inoperative position.

16. An apparatus as claimed in claim 14 wherein said advancing means includes an endless pin belt having an upper flight, said upper flight longitudinally extending along said ticket receiving surface and passing beneath said glue nozzles so as to engage said ticket and means for directing said belt along a selected one of said second and third directions.

17. An apparatus as claimed in claim 16 wherein said directing means includes a pair of opposed, rotatable shafts transversely disposed beneath said ticket receiving surface at opposite ends of said upper flight of said belt, said shafts having opposed ends, rollers attached to one of said ends over which said belt passes and a ratchet gear secured at each of said other ends, a pawl assembly capable of engagement with a selected one of said ratchet gears and a drive train connected to said power means and said pawl assembly for rotating a selected one of said rollers to advance said belt in a selected one of said second and third directions.

18. An apparatus as claimed in claim 16 and further including means on said frame adjacent said downstream end of said conveyors for lifting said ticket from said conveyors and depositing said ticket in engagement with said pin belt, said lifting means including a conveyor belt supported transversely over said ticket receiving surface and operatively connected to said power means, said conveyor having a lower flight and said ticket being lifted off of said conveyors by said lower flight and means on said conveyor for limiting the forward movement of said ticket on said lower flight.

19. An apparatus as claimed in claim 18 and further including means for applying a suction along said lower flight so as to secure said ticket onto said conveyor and means operatively connected to said suction applying means to interrupt the suction to said conveyor as said ticket engages said limiting means.

20. An apparatus for forming a bank of tickets from a supply of tickets, comprising:

(a) a frame;
(b) means on said frame for stripping the bottommost ticket from said supply of tickets;
(c) means on said frame for gluing each of said tickets so stripped in adhesive cooperation to form said bank, said gluing means being remote from said stripping means;
(d) means on said frame for feeding along a first direction each of said stripped tickets from said stripping means to said gluing means;
(e) means on said frame adjacent said gluing means for advancing said glued tickets in a second direction which is transverse to said first direction; and
(f) means on said frame for powering said stripping, gluing, feeding and advancing means in timed relationship to each other.

21. An apparatus as claimed in claim 20 and further including means for advancing said glued tickets in a third direction which is opposite to said second direction.

22. An apparatus as claimed in claim 20 and further including means for lifting said stripped tickets from said feeding means and depositing said lifted tickets into engagement with said advancing means.

* * * * *